(12) United States Patent
Kamata et al.

(10) Patent No.: US 12,253,316 B2
(45) Date of Patent: Mar. 18, 2025

(54) HEAT EXCHANGE STRUCTURE

(71) Applicant: IHI CORPORATION, Tokyo (JP)

(72) Inventors: Hiroyuki Kamata, Tokyo (JP); Shigeki Sakakura, Tokyo (JP); Nobuyuki Honma, Tokyo (JP); Akihisa Yano, Tokyo (JP); Taiga Yamamoto, Tokyo (JP); Yusuke Takeuchi, Tokyo (JP); Takuya Yoshinoya, Tokyo (JP); Takuya Hashimoto, Tokyo (JP); Daisuke Tsunoda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 211 days.

(21) Appl. No.: 18/087,028

(22) Filed: Dec. 22, 2022

(65) Prior Publication Data

US 2023/0130349 A1 Apr. 27, 2023

Related U.S. Application Data

(63) Continuation of application No. PCT/JP2020/029292, filed on Jul. 30, 2020.

(51) Int. Cl.
*F28F 3/06* (2006.01)
(52) U.S. Cl.
CPC ..................... *F28F 3/06* (2013.01)
(58) Field of Classification Search
CPC ... F28F 3/06; F28F 3/048; F28F 3/027; F28D 7/0025; F28D 9/0037
USPC ........................................................ 165/166
See application file for complete search history.

(56) References Cited

U.S. PATENT DOCUMENTS

| | | | |
|---|---|---|---|
| 2,091,274 A | 8/1937 | Eggleston | |
| 2,826,220 A | 3/1958 | Young | |
| 9,243,853 B2 | 1/2016 | Velan | |
| 10,350,575 B2 | 7/2019 | Yano et al. | |
| 2004/0228781 A1 | 11/2004 | Tonkovich et al. | |
| 2004/0229752 A1 | 11/2004 | Long et al. | |
| 2007/0140955 A1 | 6/2007 | Tonkovich et al. | |

(Continued)

FOREIGN PATENT DOCUMENTS

| | | | | |
|---|---|---|---|---|
| DE | 102015110974 A1 * | 1/2017 | ......... | F28D 21/0003 |
| JP | S49-087753 U1 | 7/1974 | | |

(Continued)

OTHER PUBLICATIONS

Barbe et al, Modelling of intensified catalyst-coated plate-fin heat exchanger reactors: Reactive fin efficiencies and by-pass factor based on coupling between reaction, heat and mass transfer, Chemical Engineering and Processing—Process Intensification, vol. 130, pp. 169-184, (Year: 2018).*

(Continued)

*Primary Examiner* — Steve S Tanenbaum

(57) ABSTRACT

A heat exchange structure includes: two flow channels stacked in a stacking direction (Y direction) and thermally coupled to each other; and a fin structure detachably installed in at least one flow channel of the two flow channels. The fin structure includes fins arranged in a longitudinal direction (Z direction) of the at least one flow channel in which the fin structure is installed, the fins configured to form openings alternately arranged along the at least one flow channel on one side and the other side of the at least one flow channel in a width direction (X direction).

12 Claims, 9 Drawing Sheets

(56) References Cited

U.S. PATENT DOCUMENTS

| | | | |
|---|---|---|---|
| 2008/0178577 A1 | 7/2008 | Ruckwied | |
| 2011/0002818 A1 | 1/2011 | Tonkovich et al. | |
| 2014/0110085 A1* | 4/2014 | Deckers | F28F 1/40 165/80.1 |
| 2017/0125863 A1* | 5/2017 | March | H01M 10/625 |
| 2018/0318786 A1* | 11/2018 | Yano | F28F 3/086 |
| 2019/0310031 A1 | 10/2019 | Disori et al. | |

FOREIGN PATENT DOCUMENTS

| | | |
|---|---|---|
| JP | S53-015656 A | 2/1978 |
| JP | S53-103961 U | 8/1978 |
| JP | S58-027337 Y2 | 6/1983 |
| JP | 2001-041676 A | 2/2001 |
| JP | 2007-534457 A | 11/2007 |
| JP | 2008-157506 A | 7/2008 |
| JP | 2008-534834 A | 8/2008 |
| JP | 4647403 B2 | 3/2011 |
| JP | 2017-140591 A | 8/2017 |
| JP | 2020-134109 A | 8/2020 |

OTHER PUBLICATIONS

European Patent Office, "Extended European Search Report", issued in European Patent Application No. 20947743.9, which is a counterpart to U.S. Appl. No. 18/087,028, on Mar. 14, 2024, 6 pages.
Japan Patent Office, "Notice of Reasons for Refusal", issued in Japanese Patent Application No. 2019-032407, mailed on Nov. 8, 2022, 6 pages (4 pages of English translation of Notice of Reasons for Refusal and 2 pages of original Notice of Reasons for Refusal).

* cited by examiner

HEAT EXCHANGE STRUCTURE

CROSS REFERENCE TO RELATED APPLICATIONS

This application is a continuation application of international Application No. PCT/JP2020/029292, now WO 2022/024309 A1, filed on Jul. 30, 2020, the entire contents of which are incorporated by reference herein.

BACKGROUND

1. Technical Field

The present disclosure relates to a heat exchange structure that performs a heat exchange between two fluids.

2. Description of the Related Art

The heat-exchange catalytic reactor includes a heat-exchange structure that performs a heat exchange between two fluids. The heat exchange structure includes a heat medium flow channel and a reaction flow channel, which are adjacent to each other. A heat medium flows in the heat medium flow channel. A reaction fluid, which contains a reactive raw material, flows in the reaction flow channel. The heat medium flow channel and the reaction flow channel are thermally coupled to each other through a partition. Therefore, the heat exchange occurs between the heat medium and the reaction fluid between which there is a temperature difference, and the reaction of the reactive raw material is promoted.

A fin structure may be installed in at least one of the heat medium flow channel and the reaction flow channel to improve the overall heat transfer coefficient between the heat medium and the reaction fluid. The fin structure is called corrugated fins or waving fins. It is formed, for example, by bending a metal plate. The fin structure has a number of fins (side surfaces) that are stretched or curved in the longitudinal direction of the channel in which the fin structure is installed. In this regard, JP 2017-140591 A discloses a heat transfer promoter as the fin structure. When the aforementioned fin structure is installed in the reaction flow channel, the catalyst may be supported on the fin structure.

SUMMARY

Typical fin structures deflect or disperse fluid along a surface on which the fins are placed. Therefore, when such a fin structure is installed in the heat exchange structure described above, the fluid generally flows along the partition. On the other hand, heat to be exchanged between the heat medium and the reaction fluid is transferred through this partition. The heat flux is proportional to the temperature difference (temperature gradient). Therefore, the heat transfer between the fluids is larger closer to the partition where the temperature boundary layer is generated, and is smaller farther from the partition. Accordingly, the farther the fluid is from the partition, the less likely it is to be heated (or cooled).

The present disclosure has been made with consideration of the above situation. That is, the present disclosure aims to provide a heat exchange structure capable of improving the overall heat transfer coefficient between two fluids flowing along a partition wall, which is a heat transfer path.

An aspect of the present disclosure is a heat exchange structure including: two flow channels stacked in a stacking direction and thermally coupled to each other, having predetermined widths in a width direction intersecting the stacking direction; and a fin structure detachably installed in at least one flow channel of the two flow channels, wherein the fin structure includes fins arranged in a longitudinal direction of the at least one flow channel in which the fin structure is installed, the fins configured to form openings alternately arranged along the at least one flow channel on one side and the other side of the at least one flow channel in the width direction.

The fins may be perpendicular to the longitudinal direction of the at least one flow channel in which the fin structure is installed. The fins may be inclined with respect to the longitudinal direction of the at least one flow channel in which the fin structure is installed. The fin structure may include a pair of strips configured to support the fins, provided on both sides of the arrangement of the fins in the width direction. The pair of strips may be integrally formed of a single member together with fins, which are supported by the strip, of the fins.

The fin structure may be formed of a first plate member and a second plate member that are overlapped in the stacking direction and are located in a middle of the stacking direction in the at least one flow channel in which the fin structure is installed. In this case, the first plate member may include first sub-fins cut and bent toward one side of the stacking direction. The second plate member may include second sub-fins cut and bent toward the other side of the stacking direction at positions corresponding to the first sub-fins. Each of the fins may be constituted from a corresponding one of the first sub-fins and a corresponding one of the second sub-fins. A catalyst is supported on the fin structure.

According to the present disclosure, it is possible to provide a heat exchange structure capable of improving the overall heat transfer coefficient between two fluids flowing along a partition wall, which is a heat transfer path.

BRIEF DESCRIPTION OF THE DRAWINGS

FIG. 1A is a cross-sectional view along the line IA-IA shown in FIG. 1B. FIG. 1B is a cross-sectional view along the line IB-IB shown in FIG. 1A.

FIG. 5A is a perspective view of the fin structure, and FIG. 5B is a cross-sectional view in a plane VB shown in FIG. 5A.

DESCRIPTION OF THE EMBODIMENTS

Figure 1A:
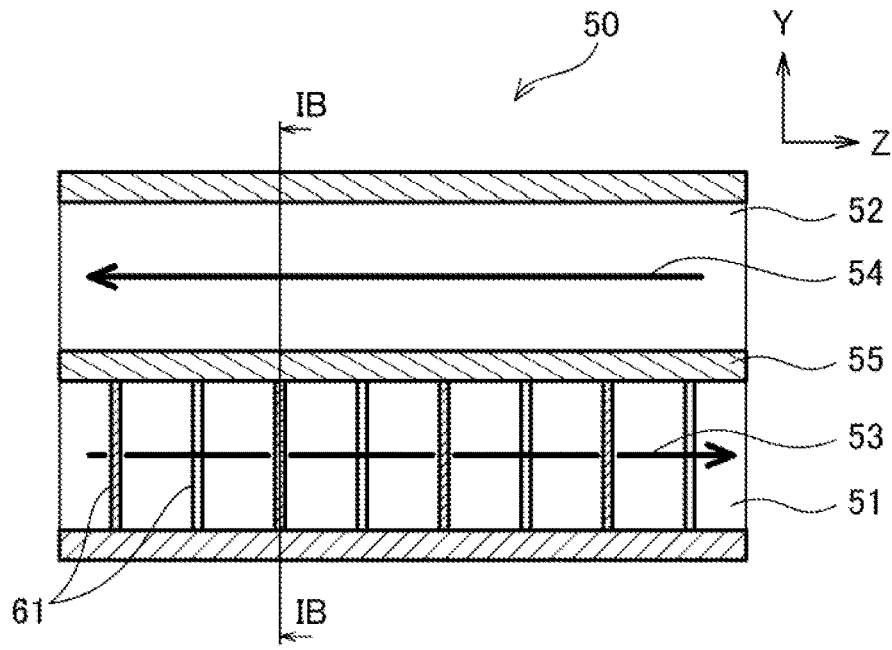
FIGS. 1A and 1B are views illustrating a heat exchange structure according to a first embodiment of the present disclosure.

Embodiments according to the present disclosure are described below with reference to the drawings. In the drawings, common parts are denoted by the same symbols and redundant explanations thereof will be omitted.

First Embodiment

A heat exchange structure 50 according to a first embodiment of the present disclosure will be described. Hereafter, for convenience of explanation, X, Y and Z directions are defined as three directions perpendicular to one another. As described later, the Y direction is a stacking direction of two flow channels 51 and 52. The Z direction is a longitudinal direction (an extending direction) of each channel. The X direction is a width direction of each channel and is also an arrangement direction when multiple channels are provided in parallel.

Figure 1B:
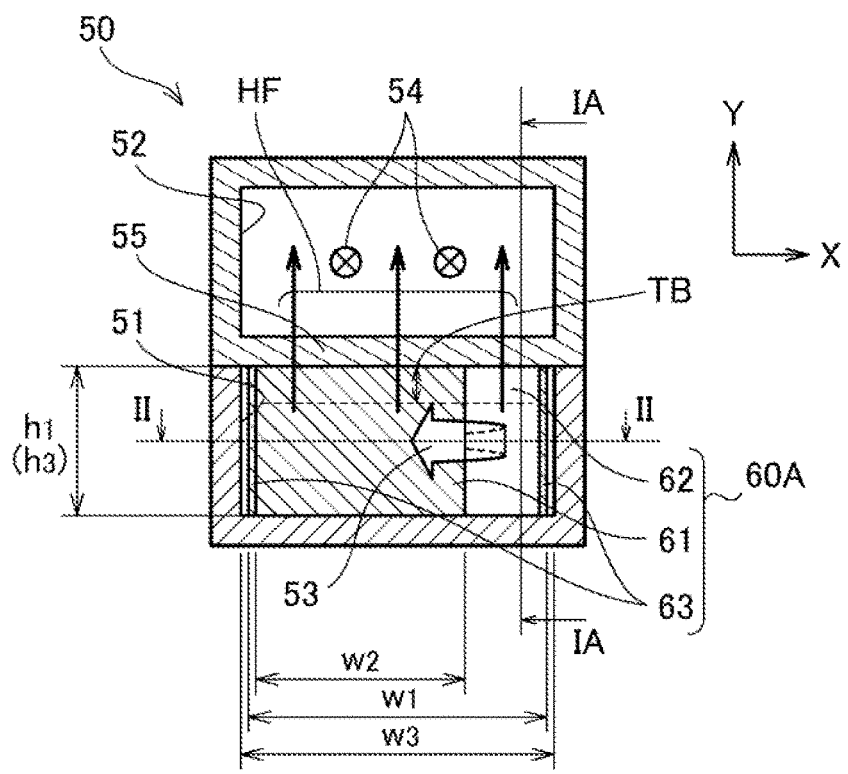
Figure 2:
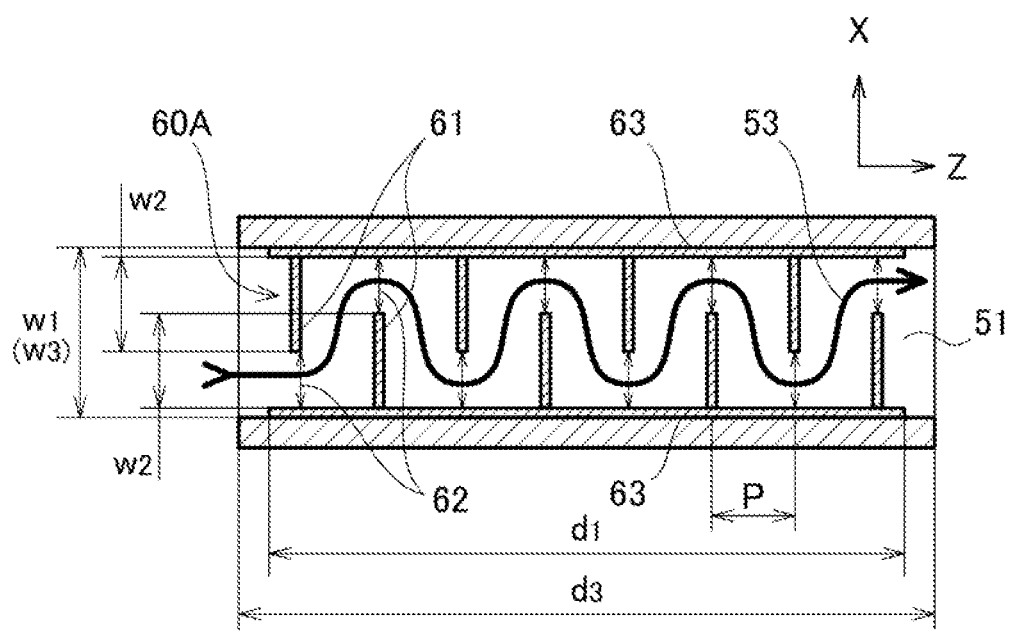
FIG. 2 is a cross-sectional view along the line II-II shown in FIG. 1B.
Figure 3:
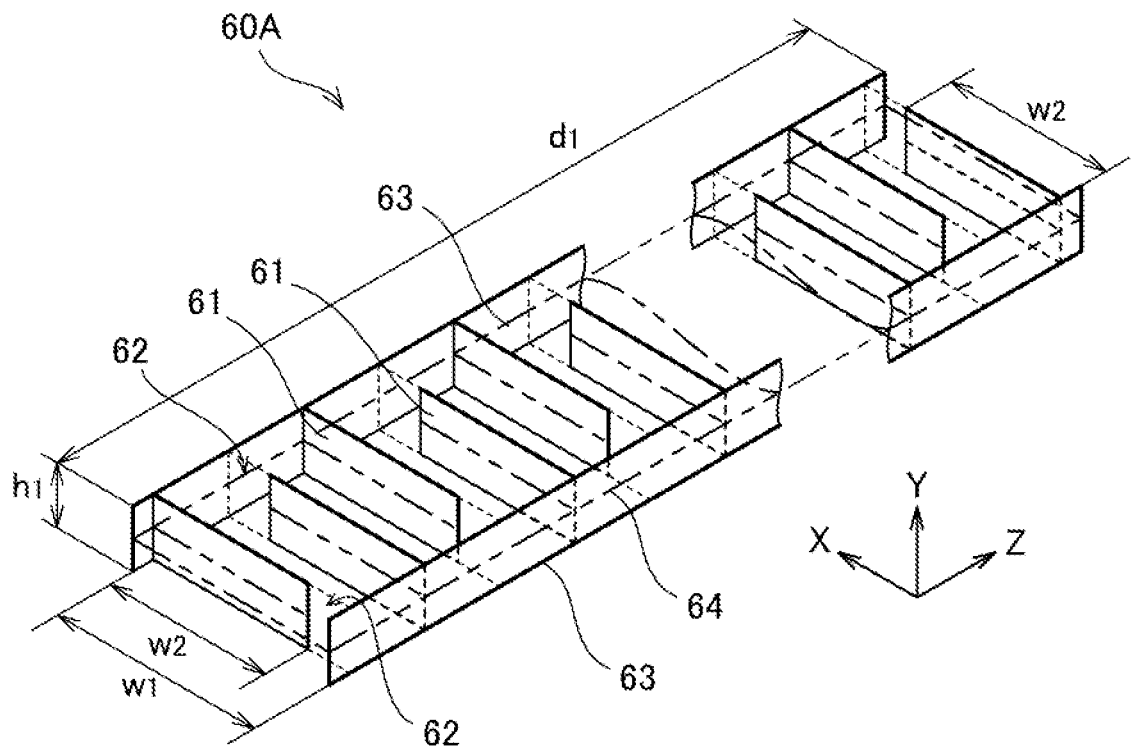
FIG. 3 is a perspective view illustrating a fin structure according to the first embodiment of the present disclosure.
Figure 4A:
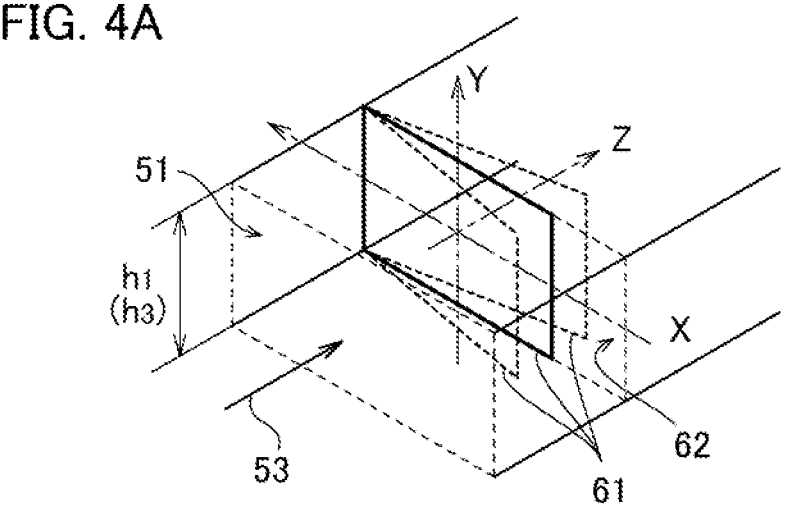
FIGS. 4A to 4C are views illustrating examples of fin arrangements according to the embodiments of the present disclosure.
Figure 4B:
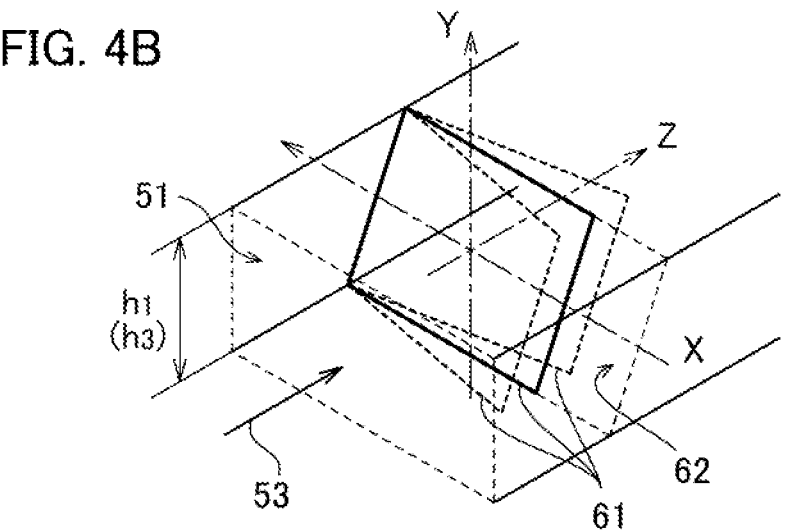
Figure 4C:
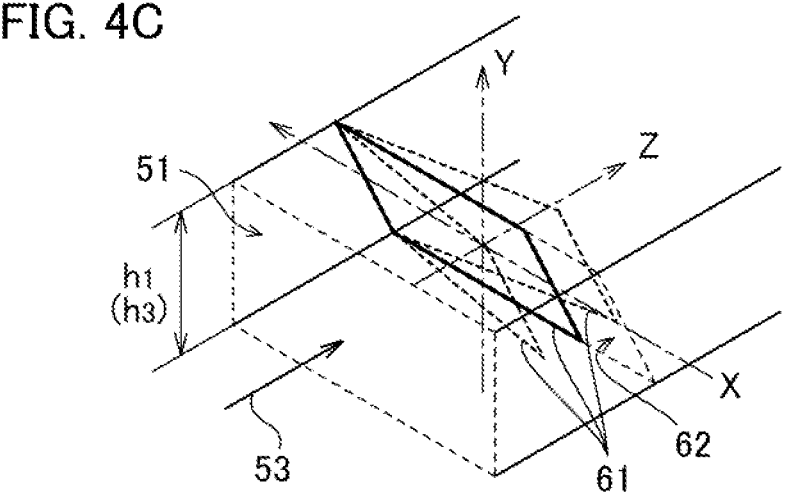

FIGS. 1A and 1B are views illustrating the heat exchange structure 50 according to the present embodiment. FIG. 1A is a cross-sectional view along the line IA-IA shown in FIG. 1B. FIG. 1B is a cross-sectional view along the line IB-IB shown in FIG. 1A. FIG. 2 is a cross-sectional view along the line II-II shown in FIG. 1B. FIG. 3 is a perspective view illustrating a fin structure according to the first embodiment of the present disclosure. FIGS. 4A to 4C are views illustrating examples of fin arrangements according to the embodiments of the present disclosure.

As shown in FIG. 1A, the heat exchange structure 50 include at least one flow channel 51 and at least one flow channel 52. The flow channels 51 and 52 have a predetermined width w3 along the X direction and extend in the Z direction, which is the longitudinal direction. The flow channels 51 and 52 are stacked along the Y direction (i.e., the stacking direction). The flow channel 51 and the flow channel 52 are provided parallel and thermally connected to each other through a partition 55. The flow channel 51 is applied as one of a first flow channel 11 and a second flow channel 21 described later, and the flow channel 52 is applied as the other of the first flow channel 11 and the second flow channel 21 (see FIGS. 6 to 9). The partition 55 between the flow channel 51 and the flow channel 52 corresponds to a first partition 13 or a second partition 23, which will be described later (see FIGS. 6 and 7).

The heat exchange structure 50 may be provided with multiple flow channels 51 and multiple flow channels 52. For example, the flow channels 51 are parallel to each other on a plane parallel to the X-Z plane, and the flow channels 52 are parallel to each other on the plane parallel to the X-Z plane. The longitudinal directions of the flow channel 51 and the flow channel 52 may be parallel to each other or may intersect with each other. That is, the latter may have a skewed relationship. In both cases, one of the flow channels 51 and 52 is thermally connected to the other of the flow channels 51 and 52 through the partition 55 in most of the sections in the longitudinal directions of the channels.

As shown in FIG. 1A, fluid 53 flows in the flow channel 51 and fluid 54 flows in the flow channel 52. The fluid 53 is one of a heat medium M and a reaction fluid R described later. The fluid 54 is the other of the heat medium M and the reaction fluid R. The flow of the fluid 53 and the fluid 54 may be countercurrent or parallel (co-current). That is, the flow directions of the fluids 53 and 54 may be opposite to each other or the same.

There is a temperature difference $\Delta T$, between fluid 53 and fluid 54. Therefore, when fluid 53 flows through flow channel 51 and fluid 54 flows through flow channel 52, heat is transferred between the fluid 53 and the fluid 54. Specifically, the heat is transferred between the fluid 53 and the fluid 54 due to convection between the fluid 53 and the partition 55, thermal conduction within the partition 55, and convection between the partition 55 and the fluid 54.

In this case, the amount of heat Q per unit time is proportional to the product of the overall heat transfer coefficient (heat transfer rate) U, the heat transfer area A of the partition 55, and the temperature difference $\Delta T$ between the fluid 53 and the fluid 54. That is, the relationship among these values is expressed by the following formula (1):

$$Q = UA(\Delta T) \tag{1}$$

Here, the heat transfer area A is constant. Since the fluid 53 and the fluid 54 flow steadily, the change in the temperature difference $\Delta T$ is small. Therefore, it is found that the increase in amount of heat Q is obtained by increasing the overall heat transfer coefficient U.

There is also the following relationship among the overall heat transfer coefficient U, the heat transfer coefficient H1 between the fluid 53 and the partition 55, the heat transfer coefficient H2 between the partition 55 and the fluid 54, and the thermal conductivity K of the partition 55, $$1/U = 1/H1 + 1/H2 + T/K \tag{2}$$

where T is the thickness of the partition 55.

From the formula (2), it is found that the overall heat transfer coefficient U increases when at least one of the heat transfer coefficients H1 and H2 increases.

The heat transfer coefficient H1 increases by accelerating the fluid 53 near the partition 55. This trend is the same for the heat transfer coefficient H2. In the present embodiment, using a fin structure 60, a path length of at least one of the fluids 53 and 54 is increased by being meandered in the X direction (see FIG. 2), and the flow of the at least one of the fluids 53 and 54 is accelerated. Therefore, the fluid in the temperature boundary layer TB near the partition 55 is accelerated and the heat transfer between the fluid and the partition 55 is promoted. That is, at least one of the heat transfer coefficient H1 and the heat transfer coefficient H2 increases. As a result, the overall heat transfer coefficient U increases, and eventually the amount of heat Q increases. That is, the overall heat transfer coefficient between two fluids can be improved in a space with a limited length.

The fin structure 60A according to the present embodiment is detachably installed in at least one of the flow channels 51 and 52. For convenience of explanation, the fin structure 60A is described below using an example shown in FIG. 1A and FIG. 1B. That is, the fin structure 60A is installed in the flow channel 51, but it is not installed in the flow channel 52.

As shown in FIG. 1B, the fin structure 60A has a width w1 in the X direction and a height h1 in the Y direction. The width w1 of the fin structure 60A is approximately equal to the width w3 of the flow channel 51. Also, the height h1 of the fin structure 60A is set to a value less than or equal to a height h3 of the flow channel 51. The width w1 is set to a value that minimizes leakage between the fin structure 60A and the inner surface of the flow channel 51. The height h1 may be set to such a value that a clearance for preventing stagnation of the fluid 53 is formed. A depth d1 of the fin structure 60A is appropriately set according to the dimensions of the flow channel 51 and the usage condition thereof. For example, depth d1 is set to a value less than or equal to depth d3 of flow channel 51 (see FIG. 2).

The fin structure 60A includes multiple fins (deflection plates, partition plates) 61. The fin 61 is a substantially rectangular piece of a thin metal plate. The metal plate faces in the Z direction and extends in the X direction. The fin 61 is perpendicular (substantially perpendicular) to the longitudinal direction (i.e., the Z direction) of the flow channel 51. The pitch (interval) P between the two fins 61 and 61 adjacent to each other may be constant or varied. That is, some of the fins 61 may be arranged at a different pitch P from the other of the fins 61. By varying the pitch P, it is possible to vary the local heat transfer coefficient along the Z direction.

As shown in FIG. 1B, the fin 61 has a height h1 in the Y direction and a width w2 in the X direction. The width w2 is smaller than the width w1 of the fin structure 60A. The difference between the width w1 of the fin structure 60A (or the width w3 of the flow channel 51) and the width w2 of the fin 61 forms an opening 62 inside the flow channel 51. As described later, the fluid 53 flows in the flow channel 51 through the opening 62.

As shown in FIG. 1B, the fins 61 are alternately arranged along the Z direction on one side and the other side of the flow channel 51 in the X direction. Therefore, the openings 62 are also alternately arranged along the Z direction on one side and the other side of the flow channel 51 in the X direction.

The fin structure 60A includes strips 63 as support portions for the fins 61. The strips 63 are provided on both sides of an arrangement of the multiple fins 61 in a direction (e.g., the X direction) intersecting the Z direction. Strips 63 and 63 support a number of fins 61 located between them.

The relative positions (distances) of the strips 63 and 63 are maintained by a link member provided between them. The link member is, for example, a flat plate 64 shown as a dashed two-dot line in FIG. 3. The flat plate 64 extends in the X and Z directions and is located between the strips 63 and 63. The flat plate 64 is located approximately in the middle of the fins 61 in the Y direction. In this case, notches are formed in one of the fins 61 and the fiat plate 64 to allow insertion of each other. Instead of the flat plate 64, multiple rod-shaped bodies (not shown) such as pins extending in the X direction may be arranged as the link member.

The fins 61 may be separately formed from the strip 63 and may be fixed to the strip 63 by welding or the like. Alternatively, the strip 63 may be integrally formed from a single member together with fins 61, which are supported by the strip 63, of the multiple fins 61. In the latter case, for example, the fins 61 and the strip 63 are integrally formed by bending a strip-shaped material. In this case, the number of components and the number of machining processes can be drastically reduced.

The fin 61 may be inclined with respect to the longitudinal direction (i.e., the Z direction) of the flow channel 51. For example, as shown by the dotted line in FIG. 4A, the fin 61 is inclined with respect to the X and Z directions in a state where it is parallel to the Y direction. As shown by solid lines in FIG. 4B and FIG. 4C, the fin 61 may be inclined in the Y and Z directions in a state where it is parallel to the X direction, or inclined in the X, Y, and Z directions as shown by dotted lines. Furthermore, the flow channel 51 may contain a mix of the fins 61 inclined in different directions. However, in any cases, the openings 62 are alternately arranged along the Z direction on one side and the other side of the flow channel 51 in the X direction.

As described above, the openings 62 open in the Z direction (i.e., the longitudinal direction) of the flow channel 51 and are alternately arranged along the flow channel 51 on one side and the other side of the flow channel 51 in the X direction (i.e., the width direction). That is, the openings 62 are arranged zigzag along the Z direction so as to reciprocate in the X direction. Therefore, the fluid 53 flows in the Z direction while repeating the reciprocation in the X direction. In other words, the fluid 53 flows in the Z direction with meandering in the X direction.

An area of the opening 62 is sufficiently smaller than the cross-sectional area of the flow channel 51 perpendicular to the Z direction. Therefore, the fluid 53 entering the flow channel 51 is accelerated in the flow channel 51.

The fin structure 60A has no structure interfering with heat transfer between the path of the meandering fluid 53 and the partition 55. In other words, in each interval in which the fluid 53 reciprocates in the X direction, the fin structure 60A has a portion (i.e., an opening) that exposes the fluid 53 to the partition 55. Therefore, part of the fluid 53 directly approaches or enters the temperature boundary Layer TB near the partition 55. Accordingly, it is possible to increase the heat transfer coefficient H1 and to improve the overall heat transfer coefficient between the fluid 53 and the fluid 54. For example, if the temperature of the fluid 53 is higher than the temperature of the fluid 54, the heat flow HF shown in FIG. 1B can be promoted.

A similar improvement in heat transfer coefficient can also be obtained by placing the fin structure 60A to the flow channel 52. That is, the heat transfer coefficient H2 can be increased by installing the fin structure 60A in the flow channel 52. Further, by installing the fin structure 60A in each of the flow channels 51 and 52, the overall heat transfer coefficient between the fluid 53 and the fluid 54 can be further improved. In any cases, the overall heat transfer coefficient between the fluid 53 and the fluid 54 can be improved by placing the fin structure 60A in a space with a limited length.

The fin structure 60A is formed of a heat-resistant material that can support a catalyst. Such materials include heat-resistant alloys mainly composed of one or more kinds of metals such as Fe (iron), Cr (chromium), Al (aluminum), Y (yttrium), Co (cobalt), Ni (nickel), Hg (magnesium), Ti (titanium), Mo (molybdenum), W (tungsten), Nb (niobium), and Ta (tantalum). For example, the fin structure 60A may be formed by molding a thin-plate structural material made of a heat-resistant alloy such as Fecralloy® or the like.

When a catalyst is supported on the fin structure 60A, the catalyst contains as a main component an active metal effective for promoting the progress of chemical reactions. The active metal is, for example, Ni (nickel), Co (cobalt), Fe (iron), Pt (platinum), Ru (ruthenium), Rh (rhodium), and/or Pd (palladium). Only one of these metals may be used, or a combination of several of these metals may be used as long as they are effective in promoting the reaction.

Second Embodiment

Next, the heat exchange structure according to a second embodiment of the present disclosure will be described. The difference of the second embodiment from the first embodiment is only a configuration of a fin structure 60B. Therefore, the following description is limited to the fin structure 60B, and descriptions about the other configurations of the second embodiment duplicated with the first embodiment are omitted. As same as the fin structure 60A, the fin structure 60B is installed in at least one of the flow channel 51 and the flow channel 52, and provides the same effect as the fin structure 60A does. For convenience of explanation, it is assumed that the fin structure 60B is installed only in the flow channel 51.

Figure 5A:
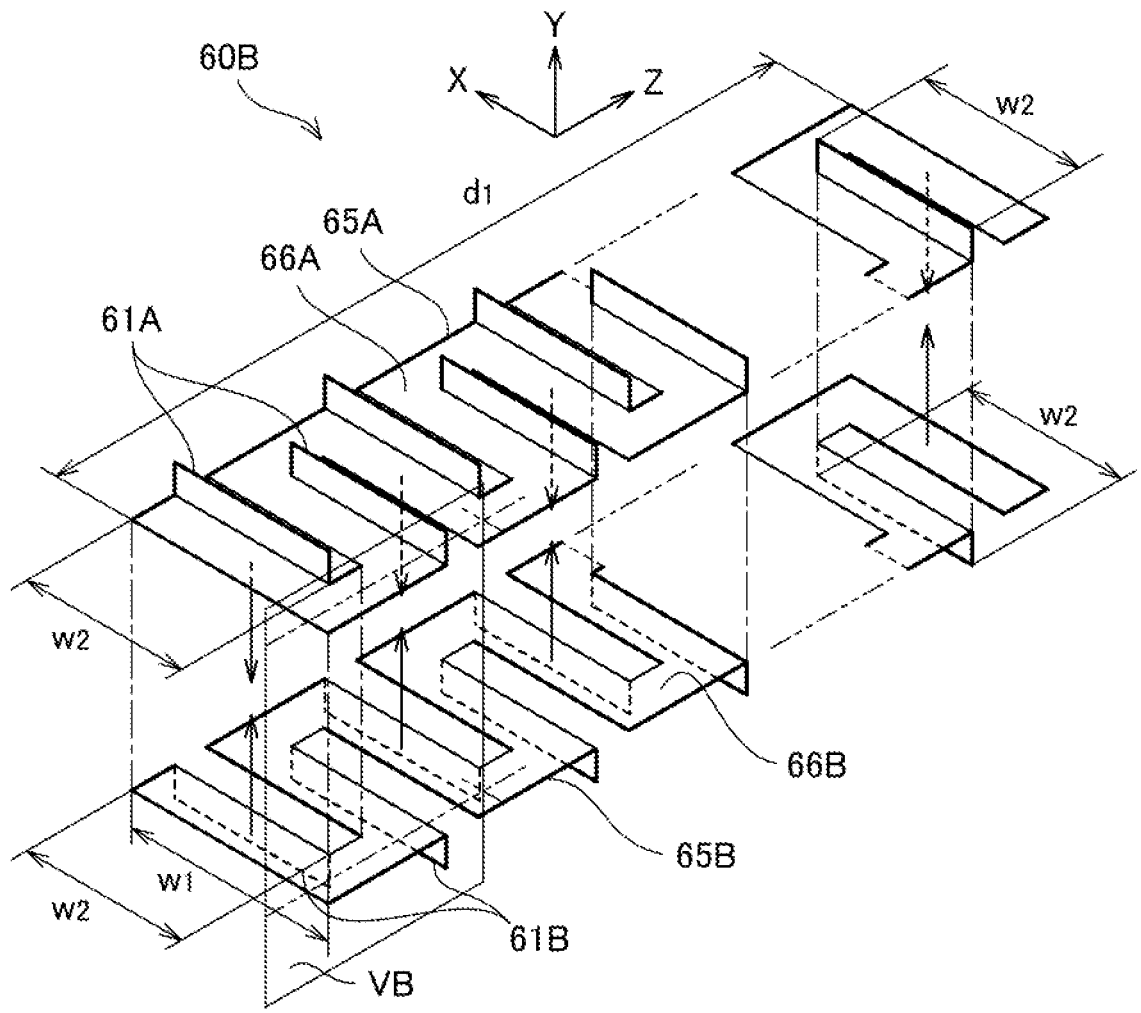
FIGS. 5A and 5B are views illustrating a fin structure according to a second embodiment of the present disclosure.
Figure 5B:
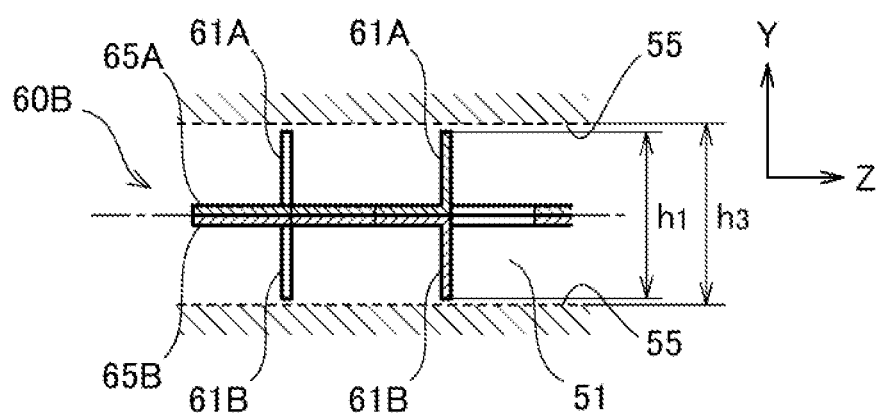

FIGS. 5A and 5B are views illustrating a fin structure 60B according to the second embodiment. FIG. 5A is a perspective view of the fin structure 60B, and FIG. 5B is a cross-sectional view in a plane VB shown in FIG. 5A. The fin structure 60B is formed of a first plate member 65A and a second plate member 65B that are overlapped in the Y direction (i.e., the stacking direction). The first plate member 65A and the second plate member 65B are located in the middle of the Y direction (i.e., the stacking direction) in the flow channel 51.

The first plate member 65A has a width w1 in the X direction and includes multiple first sub-fins 61A. As similar to the fin 61 of the first embodiment, the first sub-fin 61A is also an approximately rectangular piece and extends in the X direction while facing the Z direction. As similar to the fins 61 of the first embodiment, the first sub-fins 61A have a width w2 in the X direction and are arranged alternately on one side and the other side in the X direction with respect to the center of the flow channel 51.

The first sub-fin 61A is formed by being cut-and-bent toward one side in the Y direction (i.e., the stacking direction). That is, the multiple first sub-fins 61A are integrally formed with the first plate member 65A. The first sub-fin 61A extends in the X and Y directions and projects to one side in the Y direction from a main part 66A of the first plate member 65A, which functions as a support portion for the first sub-fin 61A.

The second plane member 65B has a width w1 in the X direction and includes multiple second sub-fins 61B. As similar to the fin 61 of the first embodiment, the second sub-fin 61B is also an approximately rectangular piece and extends in the X direction while facing the Z direction. As similar to the fins 61 of the first embodiment, the second sub-fins 61B have a width w2 in the X direction and are arranged alternately on one side and the other side in the X direction with respect to the center of the flow channel 51.

While the first sub-fin 61A is cut and bent toward one side in the Y direction, the second sub-fin 61B is cut and bent toward the other side in the Y direction. The second sub-fins 61B are integrally formed with the second plate member 65B. The second sub-fin 61B extends in the X and Y directions and projects to the other side in the Y direction from a main part 66B of the second plate member 65B, which functions as a support portion for the second sub-fin 61B.

The second sub-fins 61B are cut and bent from the second plate member 65B at positions corresponding to the first sub-fin 61A. That is, the first sub-fin 61A and the second sub-fin 61B are provided at the same position in the Z direction. On the other hand, the main part 66A of the first plate member 65A and the main part 66B of the second plate member 65B are overlapped on each other. Therefore, the first sub-fin 61A and the second sub-fin 61B constitute a fin with a height h1, which extends in the X and Y directions, as same as the fin 61 of the first embodiment.

As similar to the fin structure 60A, the fin structure 60B has no structure interfering with heat transfer between the path of the meandering fluid 53 and the partition 55, thereby improving the overall heat transfer coefficient. The first sub-fins 61A are integrally formed with the main part 66A of the first plate member 65A supporting the first sub-fins 61A, and the second sub-fins 61B are also integrally formed with the main part 66B of the second plate member 65B supporting the second sub-fins 61B. That is, the fin structure 60B can be formed simply by the lancing process for each of the first plate member 65A and the second plate member 65B and the process of overlapping the two. Therefore, the number of components and the number of machining processes can be drastically reduced.

Application Example

The fin structure 60A (60B) described above has no physical structure between it and the partition of the fluid through which heat is transferred. Therefore, the heat can be efficiently transferred. For example, assuming a configuration in which an assembly of parallel flow channels 51 and an assembly of parallel flow channels 52 are stacked on each other, heat moves mainly along the Y direction between fluids 53 and 54. Therefore, heat exchange can be improved by using the fin structure 60A (60B). The reactor (catalytic reactor) described below is designed with taking into consideration this point.

Hereinafter, a reactor (catalytic reactor) 1 is described as an example to which the heat exchange structure 50 is applied. The reactor 1 includes a heat exchange section 2 as the heat exchange structure 50. As described later, first heat transfer bodies 10 and second heat transfer bodies 20 are stacked in the Y direction, and first flow channels (channels) 11 and second flow channels (channels) 21 extend in the Z direction. In addition, the width direction of each channel is taken as the X direction described above. The direction is also the alignment direction when multiple first flow channels 11 (second flow channels 21) are provided in parallel.

Figure 6:
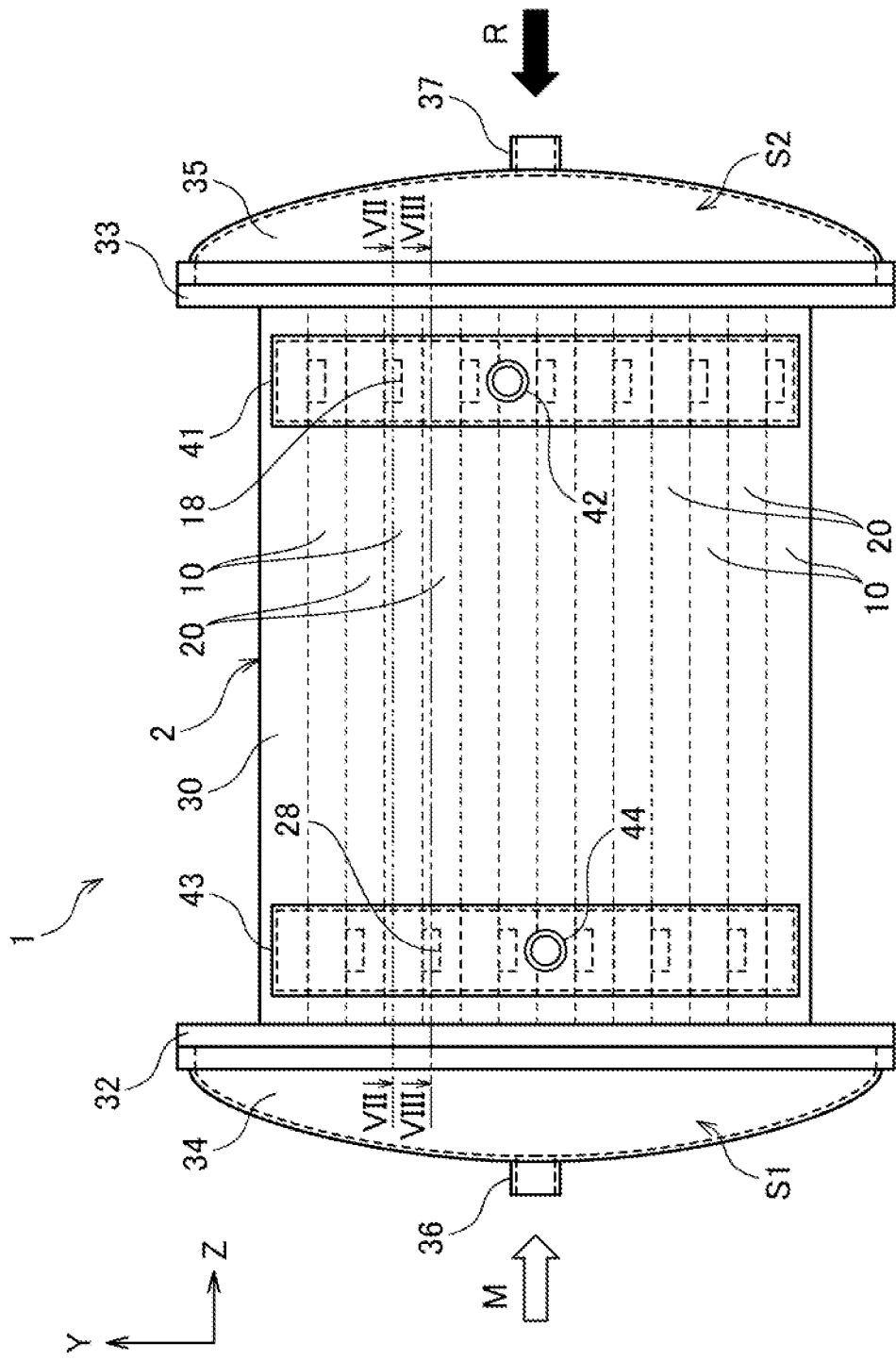
FIG. 6 is a side view illustrating a reactor including the heat exchange structure according to the present embodiment.
Figure 7:
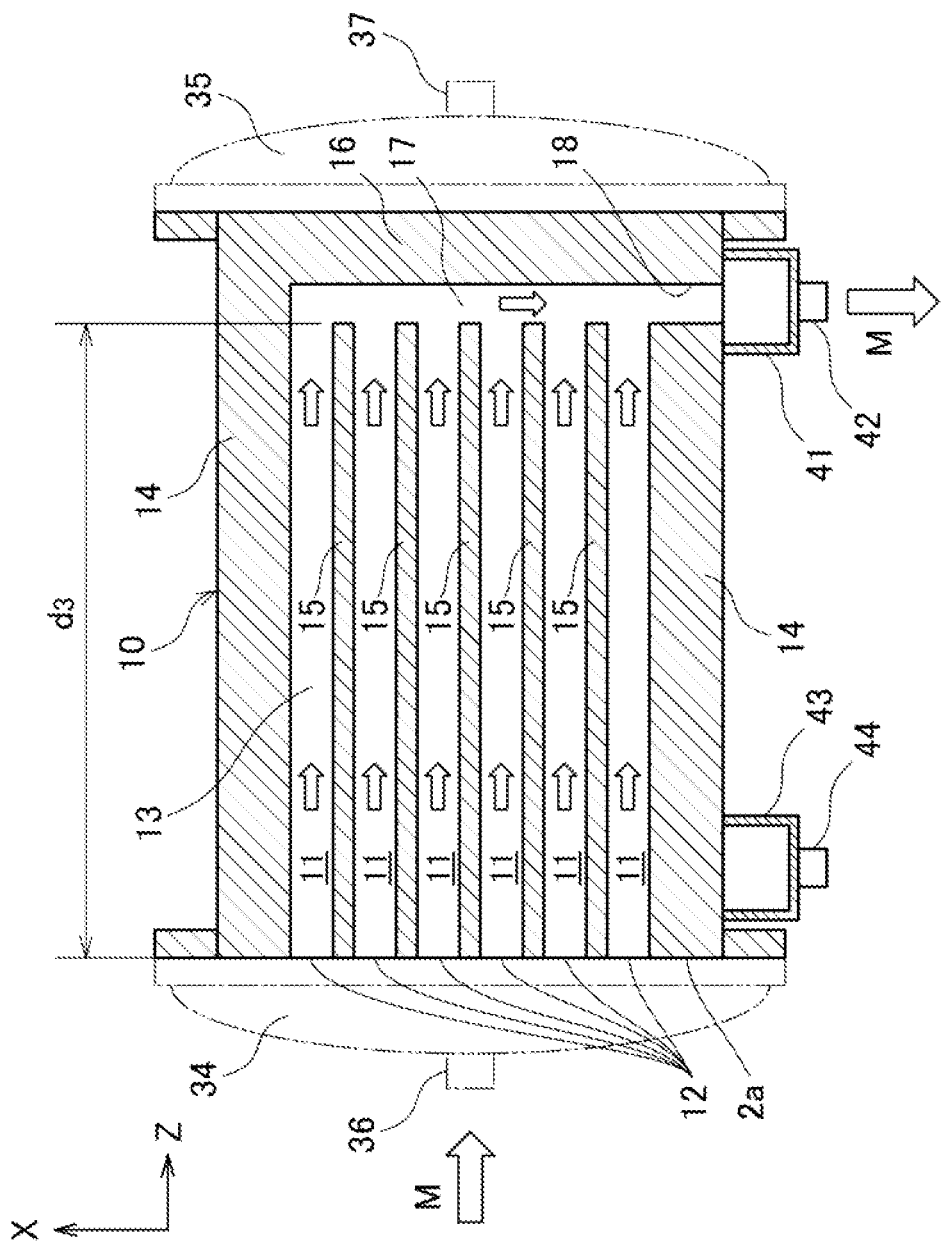
FIG. 7 is a cross-sectional view along the line VII-VII in FIG. 6.
Figure 8:
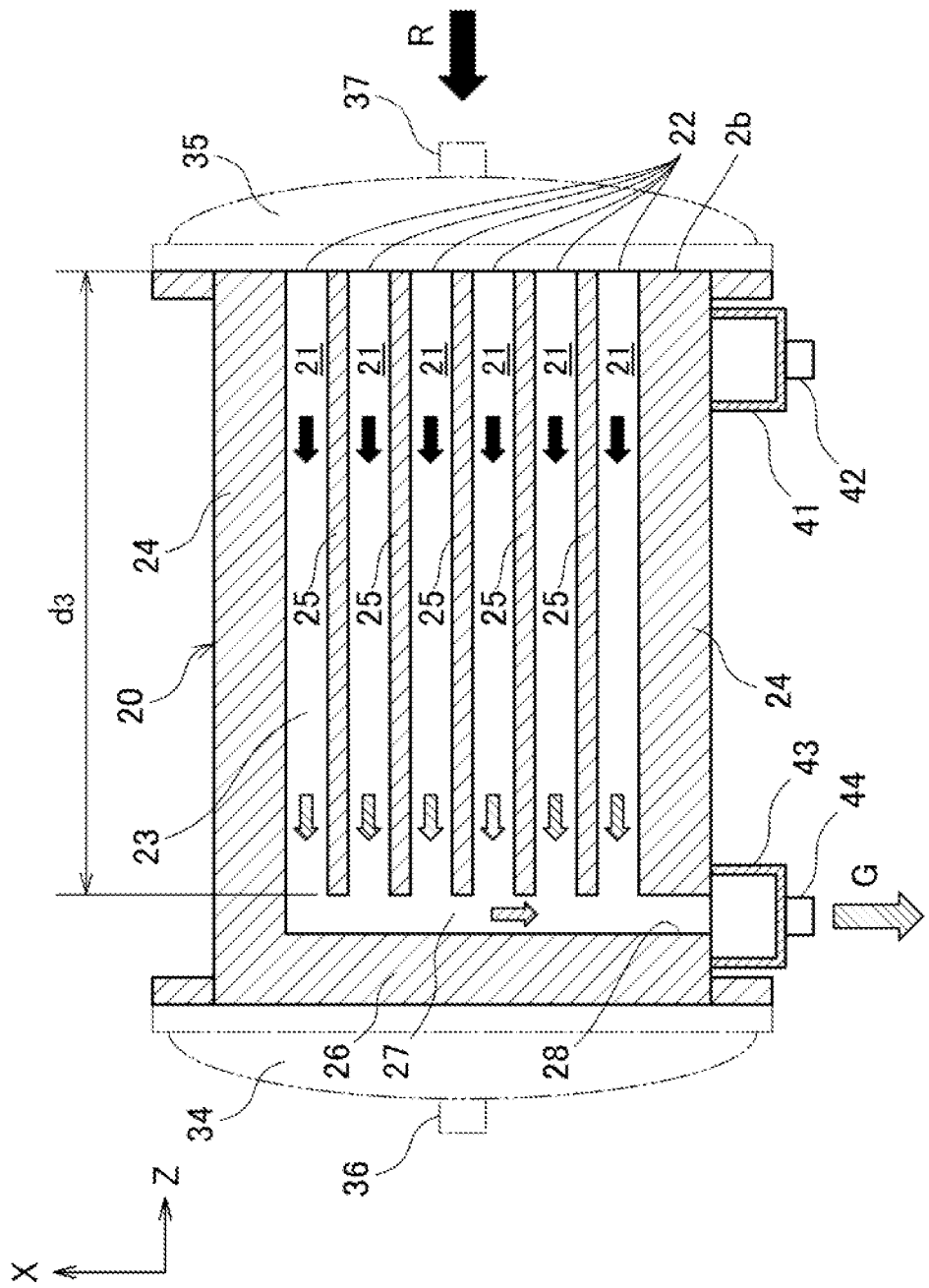
FIG. 8 is a cross-sectional view along the VIII-VIII line in FIG. 6.
Figure 9:
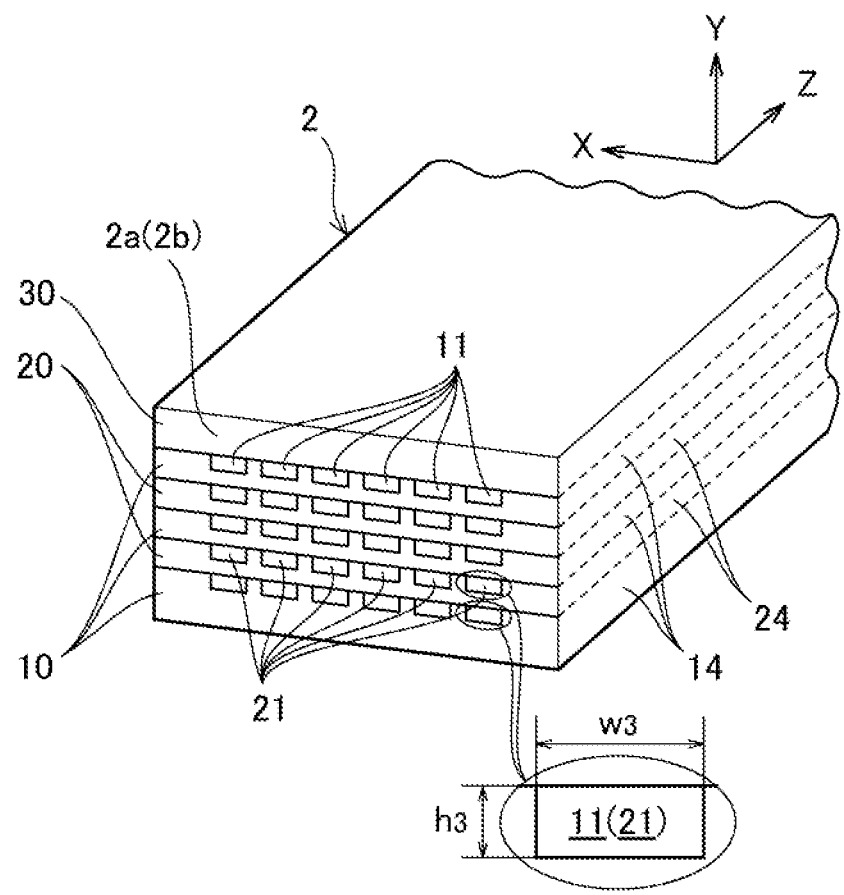
FIG. 9 is a three-dimensional view with a cross section illustrating a part of the heat exchange section according to the present embodiment.

FIG. 6 is a side view illustrating the reactor (catalytic reactor) 1 including the heat exchange structure 50 according to the present embodiment. FIG. 7 is a cross-sectional view taken along the line VII-VII in FIG. 6. FIG. 8 is a cross-sectional view taken along the line VIII-VIII in FIG. 6. FIG. 9 is a three-dimensional view with a cross section illustrating a part of the heat exchange section 2 as the heat exchange structure 50.

The reactor 1 heats or cools the reaction fluid R containing a reactive raw material to progress (promote) the reaction of the reaction fluid R. For the heating or cooling, the reactor 1 includes the heat exchange section 2 as the heat exchange structure 50 (see FIG. 1) that exchanges (transfers) heat between the heat medium M and the reaction fluid R. The heat exchange section 2 includes the first heat transfer bodies 10, the second heat transfer bodies 20, and a lid plate 30. The first heat transfer body 10, the second heat transfer body 20 and the lid plate 30 are flat plate members formed of heat-resistant and thermally conductive materials. They have sufficient thickness to withstand a high internal pressure generated while the reaction fluid R flows.

The first heat transfer body 10 includes channels (hereafter referred to as first channels) 11 through which the heat medium M flows. The second heat transfer body 20 includes channels (hereafter referred to as second channels) 21 through which the reaction fluid R flows. The first heat transfer bodies 10 and the second heat transfer bodies 20 are stacked alternately in the Y direction (i.e., the stacking direction). The lid plate 30 is set on the top of them.

With the stacking described above, the first flow channels 11 and the second flow channels 21 are adjacent to each other through a first partition 13 or a second partition 23 (see FIG. 9). In other words, the first flow channels 11 and the second flow channels 21 are stacked in a non-contact state in the stacking direction of the first heat transfer bodies 10 and the second heat transfer bodies 20. As described above, the first heat transfer body 10 and the second heat transfer body 20 are formed of a thermally conductive material. Therefore, the first flow channel 11 and the second flow channel 21 are thermally coupled to each other.

The heat exchange section 2 has a counter-flow type structure in which the reaction fluid R and the heat medium M flow in opposite directions. The fin structure 60A (60B) (see FIGS. 1 to 5) is detachably installed in the first flow channels 11, the second flow channels 21, or both. The fin structure 60A (60B) on which a catalyst is supported may be detachably installed in the second flow channel 21 through which the reaction fluid R flows.

The heat exchange section 2 is formed of at least one set or the first heat transfer body 10 and the second heat transfer body 20. The number of each heat transfer body may also be increased to improve the heat exchange performance. The number of channels formed in each heat transfer body is set depending on the design conditions of the heat exchange section 2, heat transfer efficiency, etc. In addition, a housing or insulation material may cover the heat exchange section 2 to reduce heat loss due to heat dissipation from the heat exchange section 2.

Both ends of the heat exchange section 2, which is a laminated body, are held by fixing members 32, 33.

A heat medium introduction section 34 is attached to the fixing member 32. The heat medium introduction section 34 is a concavely curved lid and forms a space S1 between the section 34 and the heat exchange section 2. First inlet ports 12 of the first flow channels 11 are opened toward the space S1 (see FIG. 7). In other words, the first inlet ports 12 are opened on the side surface (end face) 2a of the heat exchange section 2 facing the heat medium introduction section 34. The heat medium introduction section 34 has a first introduction tube 36 to introduce the heat medium M. The heat medium M flows into each first flow channel 11 through the first introduction tube 36.

The heat medium introduction section 34 is detachably or openably set on the fixing member 32. By this attachment and detachment, for example, the operator can insert and remove the fin structures 60A (60B) from the first flow channels 11.

The heat medium discharge section 41 is a box-shaped member having one opened face. The heat medium discharge section 41 is attached to the heat exchange section 2 so that the opened face faces the first discharge ports 18 of the first heat transfer bodies 10. The heat medium discharge section 41 includes a first discharge pipe 42. The first discharge pipe 42 discharges the heat medium M that has passed through the heat exchange section 2.

A reaction fluid introduction section 35 is attached to the fixing member 33. As similar to the heat medium introduction section 34, the reaction fluid introduction section 35 is a concavely curved lid and forms a space S2 between the section 35 and the heat exchange section 2. Second inlet ports 22 of the second flow channels 21 are opened toward the space S2 (see FIG. 8). In other words, the second inlet ports 22 are opened on the side surface (end face) 2b of the heat exchange section 2 facing the reaction fluid introduction section 35. The reaction fluid introduction section 35 has a second introduction tube 37 to introduce the reaction fluid R. The reaction fluid R flows into each second flow channel 21 through the second introduction tube 37.

The reaction fluid introduction section 35 is detachably or openably set on the fixing member 33. By this attachment and detachment, for example, the operator can insert and remove the fin structures 60A (60B) from the second flow channels 21.

As similar to the heat medium discharge section 41, the product discharge section 43 is a box-shaped member having one opened face. The product discharge section 43 is attached to the heat exchange section 2 so that the opened face faces the second discharge port 28 of the second heat transfer body 20. The product discharge section 43 includes a second discharge pipe 44. The second discharge pipe 44 discharges the reaction gas G containing products derived from the reaction fluid R.

As shown in FIG. 7, the first heat transfer body 10 includes multiple first flow channels 11. The first flow channels 11 extend in the Z direction and are arranged in the X direction (the width direction). The first flow channels 11 supply the heat of the heat medium M to the first heat transfer body 10.

The first flow channels 11 are grooves formed on one surface (e.g., the upper surface in the present embodiment) of the first heat transfer body 10. Each groove has a rectangular cross section having a width w3 and a height h3 (see FIG. 9) and extends in one direction with a length of a depth d3 (see FIG. 7). The width w3 has a value greater than or equal to the width w1 of the fin structure 60A (60B). Similarly, the height h3 also has a value greater than or equal to the height h1 of the fin structure 60A (60B). The depth d3 is greater than the depth d1 of the fin structure 60A (60B).

The first flow channels 11 linearly extend from the first inlet port 12 located on the side of the fixing member 32 toward the fixing member 33. As shown in FIG. 7, the multiple first flow channels 11 are arranged in parallel. The first flow channels 11 may be different in the width, height and length.

The first heat transfer body 10 includes a first partition 13, two first sidewalls 14, multiple first intermediate walls 15, and a first end wall 16. The first sidewalls 14, the first intermediate walls 15 and the first and wall 16 are provided on one side of the first partition 13. That is, they are provided on the same surface as the surface on which the first sidewall 14, etc. is provided for the first partition 13. The first partition 13 is a rectangular wall and defines the overall shape of the first heat transfer body 10. The first sidewalls 14 are wall parts provided on both sides of the extending direction of the first flaw channels 11. The first intermediate walls 15 are located between the two first sidewalls 14 and are wall parts provided in parallel with each first sidewall 14.

The first end wall 16 is provided on the opposite side of the first inlet ports 12 cross the first flow channels 11. The first end wall 16 is a wall extending in the alignment direction of the first flow channels 11. The first end wall 16 blocks the inflow of the heat medium M toward the space S2.

The first heat transfer body 10 includes a first connection flow channel 17 extending along the first end wall 16. The first connection flow channel 17 is connected with all the first flow channels 11 and the first discharge port 18.

As shown in FIG. 8, the second heat transfer body 20 includes multiple second flow channels 21 including reaction regions. The middle section of the second flow channel 21 is the main reaction region. The second flow channels 21 extend in the Z direction and are arranged in the X direction (the width direction). The second flow channel 21 receives the heat of the heat medium M flowing through the first flow channel 11 in the first heat transfer body 10 to react the reaction fluid R to produce the reaction gas G containing the products derived from the reaction fluid R.

The second flow channels 21 are grooves formed on one surface (the upper surface in the present embodiment) of the second heat transfer body 20. Each groove has a rectangular cross section having a width w3 and a height h3 (see FIG. 9) and extends in one direction with a length of a depth d3 (see FIG. 8). The second flow channels 21 linearly extend from the second inlet port 22 located on the side of the fixing member 33 toward the fixing member 32. As shown in FIG. 8, the multiple second flow channels 21 are arranged in parallel.

The second heat transfer body 20 includes a second partition 23, two second sidewalls 24, multiple second intermediate walls 25, and a second end wall 26. The second sidewalls 24, the second intermediate walls 25 and the second end wall 26 are provided on one side of the second partition 23. The second partition 23 is a rectangular wall and defines the overall shape of the second heat transfer body 20. The second sidewalls 24 are wall parts provided on both sides of the extending direction of the second flow channels 21. The second intermediate walls 25 are located between the two second sidewalls 24 and are wall parts provided in parallel with each second sidewall 24.

The second end wall 26 is provided on the opposite side of the second inlet ports 22 across the second flow channel 21. The second end wall 26 is a wall extending in the alignment direction of the second flow channels 21. The second end wall 26 blocks the inflow of the reaction gas G toward the space S1.

The second heat transfer body 20 includes a second connection flow channel 27 extending along the second end wall 26. The second connection flow channel 27 is connected with all the second flow channels 21 and the second discharge port 28. As similar to the first flow channel 11, the second connection flow channel 27 is a fluid channel, and there is no substantial difference between the two.

The heat exchange section 2 can be used as any of a liquid-liquid heat exchanger, a gas-gas heat exchanger and a gas-liquid heat exchanger. The reaction fluid R may be any of a gas and a liquid. The heat medium M may be any of a gas and a liquid. In addition, the reactor 1 of the present embodiment enables chemical synthesis through various thermal reactions such as endothermic and exothermic reactions. Examples of such syntheses by thermal reactions include endothermic reactions such as the steam reforming reaction of methane represented by formula (3), the dry reforming reaction of methane represented by formula (4), the shift reaction represented by formula (5), the methanation reaction represented by formula (6), and the Fischer-Tropsch synthesis reaction represented by formula (7). Note that the reaction fluid R in these reactions is a gas.

$$CH_4 + H_2O \rightarrow 3H_2 + CO \quad (3)$$

$$CH_4 + CO_2 \rightarrow 2H_2 + 2CO \quad (4)$$

$$CO + H_2O \rightarrow CO_2 + H_2 \quad (5)$$

$$CO + 3H_2 \rightarrow CH_4 + H_2O \quad (6)$$

$$(2n+1)H_2 + nCO \rightarrow C_nH_{2n+2} + nH_2O \quad (7)$$

It is desirable that the heat medium M is a substance that does not corrode the components of the reactor 1. When a heated gas is used as the heat medium M, gaseous materials such a combustion gas and a heated air can be used. The heat medium M may be a liquid substance such as water or oil, for example.

It should be noted that the present disclosure is not limited to the embodiments described above, but is indicated by the claims, and further includes all modifications within and meaning equivalent to the scope of the claims.

What is claimed is:

1. A heat exchange structure comprising:
   two flow channels stacked in a stacking direction and thermally coupled to each other, having predetermined widths in a width direction intersecting the stacking direction; and
   a fin structure detachably installed in each of the two flow channels, wherein
   the fin structure includes fins arranged in a longitudinal direction of a corresponding one of the two flow channels in which the fin structure is installed, the fins configured to form openings alternately arranged along the corresponding one of the two flow channels on one side and the other side of the corresponding one of the two flow channels in the width direction.

2. The heat exchange structure according to claim 1, wherein
   a catalyst is supported on the fin structure in one of the two flow channels.

3. The heat exchange structure according to claim 1, wherein
   the fins are perpendicular to the longitudinal direction.

4. The heat exchange structure according to claim 3, wherein
   a catalyst is supported on the fin structure in one of the two flow channels.

5. The heat exchange structure according to claim 1, wherein
   the fins are inclined with respect to the longitudinal direction.

6. The heat exchange structure according to claim 5, wherein
   a catalyst is supported on the fin structure in one of the two flow channels.

7. The heat exchange structure according to claim 1, wherein:
   the fin structure is formed of a first plate member and a second plate member that are overlapped in the stacking direction and are located in a middle of the stacking direction in the corresponding one of the two flow channels in which the fin structure is installed;
   the first plate member includes first sub-fins cut and bent toward one side of the stacking direction;
   the second plate member includes second sub-fins cut and bent toward the other side of the stacking direction at positions corresponding to the first sub-fins; and
   each of the fins is constituted from a corresponding one of the first sub-fins and a corresponding one of the second sub-fins.

8. The heat exchange structure according to claim 7, wherein
   a catalyst is supported on the fin structure in one of the two flow channels.

9. The heat exchange structure according to claim 1, wherein
   the fin structure includes a pair of strips configured to support the fins, provided on both sides of the arrangement of the fins in the width direction.

10. The heat exchange structure according to claim 9, wherein
    a catalyst is supported on the fin structure in one of the two flow channels.

11. The heat exchange structure according to claim 9, wherein
    each of the pair of strips is integrally formed with the fins.

12. The heat exchange structure according to claim 11, wherein
a catalyst is supported on the fin structure in one of the two flow channels.

* * * * *